United States Patent [19]

Krimm et al.

[11] 4,377,670
[45] Mar. 22, 1983

[54] COPOLYMERS BASED ON ALIPHATIC POLYCARBONATES AND LACTAMS

[75] Inventors: Heinrich Krimm; Hans-Josef Buysch; Artur Botta, all of Krefeld, Fed. Rep. of Germany

[73] Assignee: Bayer Aktiengesellschaft, Leverkusen, Fed. Rep. of Germany

[21] Appl. No.: 314,242

[22] Filed: Oct. 23, 1981

[30] Foreign Application Priority Data

Oct. 29, 1980 [DE] Fed. Rep. of Germany ....... 3040613

[51] Int. Cl.³ .................. C08G 63/62; C08G 69/16
[52] U.S. Cl. ........................... 525/467; 528/129; 528/203; 528/211; 528/323; 528/327; 528/328; 528/369
[58] Field of Search .............. 525/467; 528/323, 327, 528/328, 369, 129, 203, 211

[56] References Cited

U.S. PATENT DOCUMENTS

| | | | |
|---|---|---|---|
| 2,600,953 | 6/1952 | Aelion | 528/323 |
| 2,786,045 | 3/1957 | Chirtel et al. | 528/323 |
| 3,197,441 | 7/1965 | Wehrmeister | 528/323 |
| 3,228,759 | 1/1966 | Small et al. | 51/298 |
| 3,450,793 | 6/1969 | Schnell et al. | 525/467 |
| 3,551,388 | 12/1970 | Sippel et al. | 528/323 |
| 3,592,873 | 7/1971 | Ishida et al. | 528/323 |
| 3,925,325 | 12/1975 | Heimsch et al. | 528/323 |
| 4,208,493 | 6/1980 | Deleens et al. | 528/323 |
| 4,265,247 | 5/1981 | Lenz et al. | 528/323 |

FOREIGN PATENT DOCUMENTS 944744 12/1963 United Kingdom.
1112943 5/1968 United Kingdom.

Primary Examiner—Harold D. Anderson
Attorney, Agent, or Firm—Connolly and Hutz

[57] ABSTRACT

Anionic copolymers of lactams and aliphatic polycarbonates having urethane and carboxylic acid ester groups, preferably having recurring structural units of the formula:

$$-NH-CO-O-Y-O-CO-(CR_2)_n-$$

wherein
R represents hydrogen or $C_1$-$C_4$-alkyl;
n represents an integer of from 2 to 13;
Y represents the residue of an alcohol of the following formula:

$$HO-X-OH,$$

wherein
X represents an open-chain, cyclic or mixed open-chain-cyclic alkylene radical having from 2 to 12 carbon atoms which is optionally substituted by $C_1$-$C_4$-alkyl and optionally interrupted by from 1 to 3 oxygen atoms, or a polyethylene glycol having a molecular weight up to 10,000 or an alkoxylation product of bifunctional phenols.

5 Claims, No Drawings

COPOLYMERS BASED ON ALIPHATIC POLYCARBONATES AND LACTAMS

This invention relates to new copolymers based on aliphatic polycarbonates and lactams, and to a process for the production thereof.

Lactams may be polymerised anionically according to a known method in the presence of alkaline catalysts. During this process, the lactam ring is opened via the intermediate stage of a metal lactamate and a linear polymer having amide groups is formed.

However, polycarbonates are completely inert to the catalysts which cause lactam polymerisation. Therefore, if a mixture of a lactam and an aliphatic polycarbonate is treated with metallic sodium, only lactam polymerisation is to be expected resulting in a reaction product having amide and carbonate groups. The property spectrum of this product should be determined to a greater or lesser extent by the characteristics of the pure polyamides and polycarbonates, depending on the composition of the starting materials.

Surprisingly, it was found that this is not the case. During the copolymerisation of equimolar quantities of lactams and polycarbonates ("equimolarity" relates in this case to the structural unit), reaction products are obtained having characteristics which cannot be derived from the characteristics of polyamides and polycarbonates.

It may be established spectroscopically that both the amide and the carbonate groups have disappeared and instead the bands which are typical of urethane groups and carboxylic acid ester groups appear. It must therefore be concluded that the alkaline copolymerisation of lactams and polycarbonates constitutes a novel type of alternating copolymerisation reaction according to the following scheme:

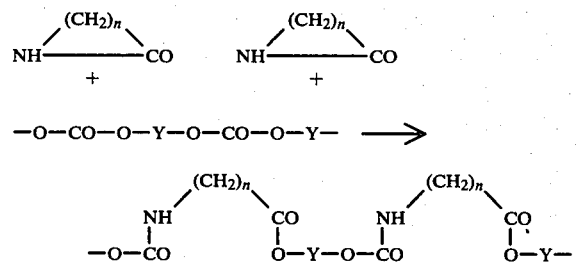

wherein R, Y and n are as defined below.

The amino carboxylic acid radical is inserted between the carbonyl group and the ester oxygen of the carbonate group.

The extent of the change in the characteristics of the homopolymers of the starting materials in the new copolymers may be illustrated, for example, from the reaction product of caprolactam and the polycarbonate of cyclohexane dimethanol. The copolymer is colourless, transparent, rubber-elastic and tough, while the polycarbonate of cyclohexane dimethanol is indeed also transparent and colourless, but is hard and rigid, thus in no way is it rubber-elastic, and the polyamide is white, opaque and tough and has a high melting point. The solubilities in solvents also differ. The polycarbonate dissolves easily in conventional solvents, such as methylene chloride, acetone, ethyl acetate and toluene, while the new copolymer only dissolves in a few polar solvents, such as dioxane, dimethyl formamide and cyclohexanone.

Accordingly, an object of the present invention is to provide anionic copolymers of lactams and polycarbonates having urethane and carboxylic acid ester groups and a process for the production thereof, characterised in that anhydrous mixtures of lactams and aliphatic polycarbonates are heated in the presence of alkaline catalysts, also the use thereof as plastics, adhesives, plasticizers and lacquers.

Lactams which are suitable correspond to the following general formula:

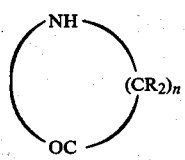

wherein

R represents hydrogen or $C_1$–$C_4$ alkyl; and n represents an integer of from 2 to 13;

in particular 4,4-dimethyl-acetidinone-2, 2-pyrrolidone, 2-piperidone, ε-caprolactam, 4-t-butyl caprolactam, capryllactam and lauryl lactam. ε-caprolactam, lauryl lactam and 2-pyrrolidone are preferred.

Aliphatic polycarbonates which are suitable are those, for example, which are obtained from alcohols corresponding to the following general formula:

$$HO-X-OH$$

wherein X represents an open-chain, cyclic or mixed open chaincyclic alkylene radical having from 2 to 12 carbon atoms which is optionally substituted by $C_1$–$C_4$ alkyl and is optionally interrupted by from 1 to 3 oxygen atoms; from polyethylene glycols having molecular weights of up to 10,000; or from alkoxylation products of bifunctional phenols, in particular from trimethylene glycol, neopentyl glycol, butane diol-1,3, butane diol-1,4, pentane diol-1,5, hexane diol-1,6, octane diol-1,8, decane diol-1,10, dodecane diol-1,12, 2,2,4,4-tetramethyl cyclobutane diol-1,3, cyclohexane diols, cyclohexane dimethanol, 2,2-bis-(4-hydroxy cyclohexyl)-propane, 2-methyl-2,4-bis-(4-hydroxy cyclohexyl)-propane, diethylene glycol, triethylene glycol and higher polyethylene glycols having molecular weights of up to 5,000 and bis-ethoxyl-hydroquinone and bis-ethoxyl-bisphenol A.

The molecular weights of the polycarbonates used range from 1,000 to 500,000, preferably from 1,000 to 50,000.

The copolymerisation components may be used in various ratios, because any excess above the stoichiometric ratio is of high molecular weight or is itself polymerisable. Thus, it is easily possible to vary the product characteristics within wide limits in that the properties may approach more closely the property spectrum of the respective homopolymer, depending on which component is in excess.

In particular mixtures of from 10 to 90%, by weight, of lactam and from 90 to 10%, by weight, of polycarbonate, preferably from 20 to 80%, by weight, of lactam and from 80 to 20%, by weight, of polycarbonate, are copolymerised.

The copolymers may also contain carbonamide and carbonate groups which may be detected spectroscopically, depending on the ratio of the reactants.

The reaction is generally carried out in the melt. However, polymerisation may also be carried out in solution and aprotic solvents, such as aromatic hydrocarbons and ethers, may be used.

The average molecular weights which may be achieved in the present process largely depend on the molecular weights of the polycarbonates used, i.e. the higher the molecular weight of the polycarbonate, the higher the molecular weight of the copolymer. Thus, another possibility is provided for varying the characteristics of the products. The molecular weights which may be achieved range from 1,000 to 150,000, preferably from 1,000 to 50,000. The molecular weights are weight averages determined by light scattering measurements.

Catalysts which are suitable for the process include, for example: alkali compounds such as lithium, sodium and potassium metals, oxides, hydroxides, carbonates, alcoholates, lactamates and the alkali metal salts of weak acids, such as of hydrocyanic acid and of carboxylic acids.

The catalysts are generally used in quantities of from 0.001 to 1%, by weight, preferably from 0.01 to 0.2% by weight, based on the total weight of the reactants.

One preferred embodiment in order to obtain a good distribution of the catalyst involves dissolving the alkali metal catalyst in some of the lactam and adding the homogeneous lactamate solution to a melt of the remaining components.

The polymerisation temperatures are from 100° to 250° C., preferably from 120° to 180° C.

The new copolymers may be used commercially in various ways. They are used as plastics, adhesives, plasticizers and lacquers which may be modified within wide limits.

EXAMPLE 1

5.65 g (0.05 mols) of caprolactam and 11.4 g (0.05 mols of the structural unit) of the polycarbonate of 1,4-cyclohexane dimethanol (molecular weight 12,000) are maintained at 175° C. until a homogeneous melt is achieved. 2 mg of sodium, dissolved in 200 mg of the caprolactam, are added and a stiffening of the melt is observed after 15 minutes. A compound is obtained which is tough and transparent at room temperature. It is soluble in dioxane, dimethyl formamide and cyclohexanone and has a molecular weight of 18,500.

EXAMPLE 2

11.3 g (0.1 mol) of caprolactam and 14.4 g (0.1 mol of the structural unit) of hexamethylene polycarbonate (molecular weight 35,000) are homogenised by stirring at 200° C. This mixture is mixed with a solution of 3 mg of sodium in 1 g of caprolactam and it is maintained at 160° C. for 2 hours. A compound is obtained which is tough, transparent and very tacky at room temperature. It is soluble in methylene chloride, benzene and acetone and has a molecular weight of 23,000.

EXAMPLE 3

11.3 g (0.1 mol) of caprolactam and 34.2 g (0.1 mol of the structural unit) of the polycarbonate of 2,2-bis-(4(2-hydroxy-ethoxy)-phenyl)-propane (bis-ethoxyl bisphenol A) of a molecular weight of 16,500 are melted and homogenised. 4 mg of sodium, dissolved in a small quantity of the caprolactam, are added and the mixture is heated at 160° C. for 2 hours. A considerable increase in the viscosity is observed. A colourless transparent, hard and tough copolymer is obtained which may be stretched at elevated temperature into threads of great strength. It dissolves in methylene chloride and dioxane, but is insoluble in toluene in which the polycarbonate dissolves easily. The molecular weight is 19,000.

EXAMPLE 4

16.9 g (0.1 mol) of 4-t-butyl caprolactam and 13 g (0.1 mol of the structural unit) of neopentyl glycol polycarbonate having a molecular weight of 13,700 are heated to 150° C. until a clear melt has formed. 5 mg of sodium, dissolved in some of the caprolactam, are added and a mixture is maintained under nitrogen at 160° C. until no further increase in viscosity may be observed. A colourless, transparent and plastic product is obtained having a molecular weight of 11,800.

EXAMPLE 5

22.6 g (0.2 mols) of caprolactam and 13 g (0.1 mol) of neopentyl glycol polycarbonate having a molecular weight of 17,900 are melted and are homogenised at 150° C. 10 mg of sodium, dissolved in 2 g of the caprolactam, are added and heated at 160° C. under nitrogen until no further increase in viscosity may be observed. A product of great adhesive power is obtained which is plastic, transparent and colourless at room temperature. It dissolves in methylene chloride and methanol and swells in acetone, ethyl acetate and toluene. The molecular weight is 21,000.

We claim:

1. A process for the production of a copolymer having weight average molecular weights between 1,000 and 150,000 determined by light scattering measurement and containing urethane and carboxylic acid ester groups, which comprises heating at a temperature from 100° to 250° C. an anhydrous mixture of a lactam and an aliphatic polycarbonate having a molecular weight in the range from 1,000 to 500,000 determined by light scattering measurements in the presence of an alkaline catalyst in amounts from 0.001 to 1% by weight based on the weight of the reactants which mixtures have from 20 to 80% by weight of lactam and from 80 to 20% by weight of said polycarbonate.

2. A process as claimed in claim 1 in which the reaction is carred out in the presence of an aprotic solvent.

3. A process as claimed in claim 1 in which the lactam corresponds to the formula:

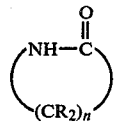

wherein R and n are as defined in claim 3; and the polycarbonate is based on (a) an alcohol corresponding to the formula:

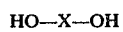

wherein X is as defined in claim 3; (b) a polyethylene glycol having a molecular weight of up to 10,000; or (c) an alkoxylation product of a bifunctional phenol.

4. A copolymer product obtained from the process according to claim 10 or claim 2 or claim 3.

5. A copolymer product obtained from the process according to claim 4 and containing structural units of the formula

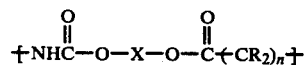

wherein

R is hydrogen or alkyl having 1 to 4 carbon atoms;
n is an integer from 2 to 13; and
X is alkylene of 2 to 12 carbon atoms which is open-chain, cyclic or open-chain/cyclic and which is unsubstituted or substituted by alkyl having 1 to 4 carbon atoms and which is interrupted by zero to 3 oxygen atoms, a polyethylene glycol moiety or a moiety from an alkoxylation product of a bifunctional phenol.

* * * * *